June 27, 1967 — P. GATES — 3,327,978
FISHING ROD SUPPORT
Filed Sept. 20, 1965
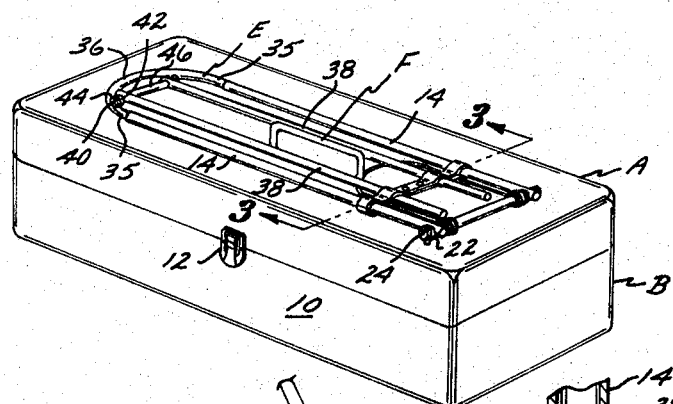
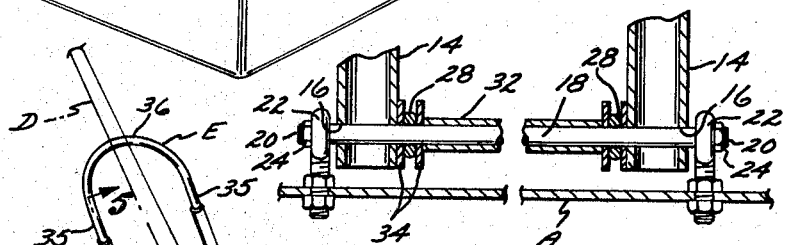
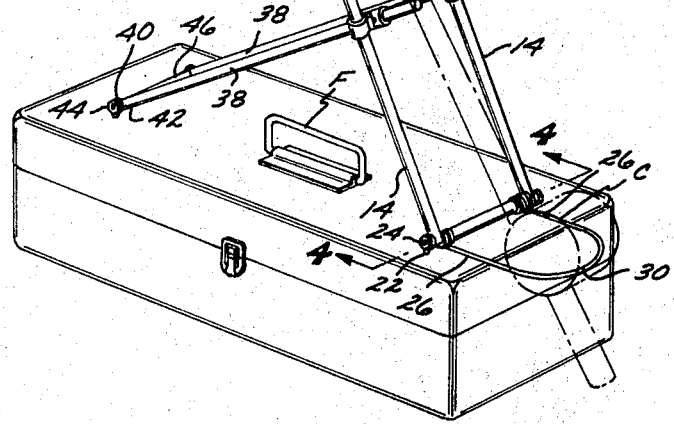
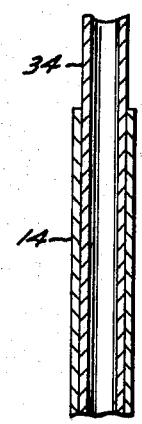
INVENTOR.
PAUL GATES
BY
William C. Babcock
ATTORNEY 3,327,978
FISHING ROD SUPPORT
Paul Gates, 2675 Fashion Ave.,
Long Beach, Calif. 90810
Filed Sept. 20, 1965, Ser. No. 488,538
8 Claims. (Cl. 248—42)

The present invention relates generally to fishing equipment, and more particularly to a portable fishing rod support.

In fishing from a stationary position such as from a pier, bridge, or the like, one annoying problem encountered is the support of the rod in a fishing position while the fisherman is absent therefrom, or otherwise engaged. A major object of the present invention is to provide a portable support for a fishing rod that will maintain the same in a fishing position while the fisherman is otherwise engaged, with the assurance that the rod will not be displaced from the supporting device, even should a relatively large fish be hooked and exert a substantial force on both the rod and support.

Another object of the invention is to supply a fishing rod support that is particularly adapted to be incorporated in the cover of a fishing tackle box, and thus be available at all times for use in supporting a rod or pole in a fishing position.

Another object of the invention is to furnish a portable, lightweight support for a fishing rod that can be fabricated from standard, commercially available materials, requires no elaborate plant facilities for its production, and can be retailed at a sufficiently low price as to encourage the widespread use thereof.

A still further object of the invention is to provide a fishing rod support that can be easily attached to a tackle box, or if desired, incorporated at the time of manufacture in the box, is simple and convenient to use, and will appreciably increase the enjoyment of fishing inasmuch as the supported fishing rod need be given a minimum of attention until such time as a fish is hooked.

These and other objects and advantages of the present invention will become apparent from the following description thereof, and from the accompanying drawing illustrating the same, in which:

FIGURE 1 is a perspective view of the fishing rod support in a collapsed position, and mounted on a base which also serves as a top for a conventional fishing tackle box;

FIGURE 2 is a perspective view of the device shown in FIGURE 1, but in a fishing rod supporting position;

FIGURE 3 is a transverse cross-sectional view of the invention, taken on the line 3—3 of FIGURE 1;

FIGURE 4 is a transverse cross-sectional view of the invention, taken on the line 4—4 of FIGURE 2; and FIGURE 5 is a fragmentary cross-sectional view of the support, taken on the line 5—5 of FIGURE 2.

With continued reference to the drawing for the general arrangement of the invention, it will be seen to include a base A, which may be either the top of a tackle box B or an elongate rigid member, not shown. The tackle box B is of conventional design, with the top A thereof being hinged thereto. The top which serves as base A is held in a closed position relative to the lower portion 10 of box B by a conventional lock 12.

The fishing rod support includes two first parallel, laterally spaced tubular members 14 formed from a rigid material, in the lower portions of which transverse aligned openings 16 are formed, as may best be seen in FIGURES 2 and 4. A rod 18 is provided, and the end portions 20 thereof are threaded. Rod 18 extends through the openings 16 and serves to pivotally support the first tubular members 14. Two laterally spaced eye bolts 22 are secured to the base A and extend upwardly therefrom.

The threaded ends 20 of rod 18 project through the eye bolts 22 in the manner shown in FIGURE 4, and the threaded ends are engaged by two nuts 24. A bail C is provided that is adapted to removably engage the lower end of a fishing rod D to support the same in a fishing position, as may be seen in FIGURE 2. The bail C has two legs 26, in the free ends of which eyes 28 are formed, with these eyes pivotally engaging the rod 18 as illustrated in FIGURES 2 and 4. The outer ends of legs 26 merge into a cross member 30.

An elongate rigid sleeve 32 is mounted on the rod 18. Two pairs of washers 34 are also mounted on rod 18, with one washer of each pair abutting against one of the first tubular members 14, and the other of the pair abutting against an outer end of sleeve 32. Each of the eyes 28 of the bail C is disposed between one of the pairs of washers 34, as shown in FIGURE 4.

An inverted U-shaped fishing rod support E is provided (FIGURE 2) that has two parallel, laterally spaced legs 35 which are connected by a cross piece 36. Legs 35 are telescopically adjustable in second interior end portions of the tubular members 14. Legs 35 slidably engage the interior surfaces of the first tubular members 14 with sufficient friction that the fishing rod support E tends to remain in the fixed longitudinal position relative to the first tubular members to which it is adjusted.

Two parallel, laterally spaced second tubular members 38 are pivotally supported from the base A on a second rod 40 that has threaded ends, and extends through two second eye bolts 42 of the same structure as the eye bolts 22. The threaded end portions of the second rod 40 are engaged by nuts 44. Openings (not shown) are formed in the second tubular members 38 through which the rod 40 extends to pivotally support the same from base A. The second tubular members 38 are maintained in a desired lateral spaced relationship by a sleeve 46 that engages the second rod 40, and is disposed between the two second tubular members 38, as may be seen in FIGURES 1 and 2. The lateral spacing of the second tubular members 38 is such that they extend between the first tubular members 14, as illustrated in FIGURES 1 and 2.

Two sleeves 48 are provided (FIGURE 3) that slidably engage the first tubular members 14. A cross piece 50 formed from a rigid strip material is disposed between the two second tubular members 38, and loops 52 are provided on the ends thereof which slidably and snugly engage the second tubular members. Flat external portions 52a of loops 52 abut against flat surfaces 48a of sleeves 48. The sleeves 48 are secured to the loops 52 by rivets 54 which project through transversely aligned openings 51 formed in the flat portions 48a and 52a previously described. Projecting portions 56 of the loops 52 are secured to adjacent portions of the cross piece 50 by rivets 58 or other suitable fastening means.

When the first tubular members 14 and second tubular members 38 are pivoted to the position shown in FIGURE 1 adjacent the base A, the supporting member E can be moved to the right as viewed in FIGURE 1 to permit the cross piece 36 to removably engage the outer portions of the second rod 40 and eye bolts 42 and removably maintain the device in the collapsed position shown in FIGURE 1.

The use and operation of the invention are relatively simple, and are substantially the same, irrespective of whether the invention is mounted on a base A that is the top of a tackle box, or a base forming no part of a tackle box, but is simply an elongate rigid member. The device is transported to the location where the fishing is to be conducted, in the collapsed form shown in FIGURE 1. For convenience in carrying, the base A or elongate member (not shown) that serves as a base, a handle F may be affixed thereto. Upon arrival, the fishing rod support E is moved to the left, as viewed in FIGURE 1, to disengage the same from the second rod 40 and eye bolts 42. The second tubular members 38 are thereafter grasped and pivoted upwardly in a counterclockwise direction, with the first tubular members 14 and the second tubular members cooperatively providing the upwardly extending triangular structure shown in FIGURE 2.

The bail C is then pivoted in a clockwise direction to the position shown in FIGURE 2, with the lower end of the fishing rod D being inserted within the confines of the bail and an upper portion of the rod resting on the cross piece 36. It will be noted that when the first tubular members 14 and second tubular members 38 are so disposed as shown in FIGURE 2, the end portions of the second tubular members project upwardly from the first tubular members, and serve as stops to prevent inadvertent lateral displacement of the fishing pole D from the supporting structure.

In using the invention to support a fishing rod D, the first tubular members 14 and second tubular members 38 must be positioned in such angular relationship that any turning moment imposed on the first tubular members will not tend to cause the first and second tubular members to move relative to one another into the collapsed position shown in FIGURE 1. The first tubular members 14 have maximum resistance to movement relative to members 38 when the longitudinal axis of the sleeve 48 are positioned in a direction normal to the longitudinal axis of the members 38.

The use and operation of the invention have been previously explained in detail and need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:
1. A fishing rod support, including:
   (a) an elongate rigid base;
   (b) two first parallel, laterally spaced tubular members;
   (c) first means on said base for pivotally supporting first end portions of said first members from a first end portion of said base;
   (d) two second parallel, laterally spaced tubular members disposed between said first members;
   (e) second means on said base for pivotally supporting first end portions of said second members from a second end of said base;
   (f) two first sleeves that slidably engage said first members;
   (g) third means that slidably engage said second members and pivotally support said sleeves, which third means and sleeves cooperatively guide said first and second members when the same are moved relative to one another;
   (h) fourth means for removably holding a first portion of said fishing rod in a substantially fixed position relative to said first means when said rod extends upwardly between said first members; and
   (i) fifth means that extend between second ends of said first members for removably supporting a second portion of said fishing rod when said first portion is held by said first means, and said first and second members are so disposed as to define an upwardly extending triangular structure above said base.

2. A device as defined in claim 1 wherein said first means is defined by:
   (j) two transversely aligned eye bolts affixed to said base;
   (k) a rod having threaded ends which extends through said eye bolts and transversely aligned openings in said first end portions of said first members;
   (l) two nuts that engage said threaded ends of said rod; and
   (m) a second sleeve on said rod between said first members for holding said first members in a desired lateral spaced relationship.

3. A device as defined in claim 2 wherein said fourth means is defined by:
   (n) a bail having eyes formed in the legs thereof, which eyes pivotally engage said rod and are disposed between the ends of said second sleeve and said first end portions of said first members.

4. A device as defined in claim 1 wherein said second means is defined by:
   (j) two transversely aligned eye bolts affixed to said base;
   (k) a rod having threaded ends which extends through said eye bolts and transversely aligned openings in said first end portions of said first members;
   (l) two nuts that engage said threaded ends of said rod; and
   (m) a second sleeve on said rod between said first members for holding said first members in a desired lateral spaced relationship.

5. A device as defined in claim 1 wherein said third means is defined by:
   (j) a cross piece that slidably engages said second members; and
   (k) two rivets secured to opposite ends of said cross piece for pivotally supporting said first sleeves therefrom.

6. A device as defined in claim 1 wherein said fifth means is defined by:
   (j) an inverted U-shaped member that is telescopically supported in said second end portions of said first members.

7. A device as defined in claim 1 wherein said fifth means is defined by:
   (j) an inverted U-shaped member telescopically supported in said second end portions of said first members, which U-shaped member when said first and second members are disposed adjacent said base is capable of being so disposed as to removably engage said second means to hold said first and second members in said adjacently disposed position relative to said base.

8. A device as defined in claim 1 wherein said base is defined by a hinged top of a fishing tackle box.

References Cited

UNITED STATES PATENTS

| | | | |
|---|---|---|---|
| 2,596,403 | 5/1952 | Hoffman | 43—21.2 |
| 2,645,050 | 7/1953 | Golias | 43—17 |
| 2,899,155 | 8/1959 | Rogers | 248—46 |
| 3,159,366 | 12/1964 | Knight | 248—42 |

JOHN PETO, *Primary Examiner.*